United States Patent
O'Brien et al.

(10) Patent No.: US 9,873,798 B2
(45) Date of Patent: Jan. 23, 2018

(54) COMPOSITION AND METHOD FOR USE IN THREE DIMENSIONAL PRINTING

(71) Applicant: General Electric Company, Schenectady, NY (US)

(72) Inventors: Michael Joseph O'Brien, Halfmoon, NY (US); Thomas Francis McNulty, Ballston Lake, NY (US); Kwok Pong Chan, Troy, NY (US)

(73) Assignee: General Electric Company, Niskayuna, NY (US)

( * ) Notice: Subject to any disclaimer, the term of this patent is extended or adjusted under 35 U.S.C. 154(b) by 789 days.

(21) Appl. No.: 14/189,363

(22) Filed: Feb. 25, 2014

(65) Prior Publication Data
US 2015/0240084 A1   Aug. 27, 2015

(51) Int. Cl.
| | | |
|---|---|---|
| C09D 4/00 | (2006.01) | |
| B29C 67/00 | (2017.01) | |
| B33Y 70/00 | (2015.01) | |
| B29C 64/106 | (2017.01) | |
| B29C 64/112 | (2017.01) | |
| B29C 64/129 | (2017.01) | |
| B29C 64/40 | (2017.01) | |
| B29K 491/00 | (2006.01) | |

(52) U.S. Cl.
CPC .............. *C09D 4/00* (2013.01); *B29C 64/106* (2017.08); *B29C 64/112* (2017.08); *B29C 64/129* (2017.08); *B29C 64/40* (2017.08); *B33Y 70/00* (2014.12); *B29K 2491/00* (2013.01)

(58) Field of Classification Search
CPC ............ B29C 67/0059; B29C 67/0092; B29C 67/0055; B29C 67/0062; B29C 67/007; B29C 64/112; B29C 64/40; B29C 64/106; B29C 64/129; B33Y 70/00
USPC .................................. 264/447; 524/849, 850
See application file for complete search history.

(56) References Cited

U.S. PATENT DOCUMENTS

| | | | |
|---|---|---|---|
| 5,503,785 | A | 4/1996 | Crump et al. |
| 5,855,836 | A | 1/1999 | Leyden et al. |
| 5,889,083 | A | 3/1999 | Zhu |
| 6,132,665 | A | 10/2000 | Bui et al. |
| 6,322,624 | B1 | 11/2001 | Titterington et al. |
| 6,586,494 | B2 | 7/2003 | Mejiritski et al. |
| 6,841,589 | B2 | 1/2005 | Schmidt et al. |
| 6,989,052 | B1 | 1/2006 | Wu et al. |
| 7,153,349 | B2 | 12/2006 | Carlini et al. |
| 7,258,275 | B1 | 8/2007 | Reddy |
| 7,271,284 | B2 | 9/2007 | Toma et al. |
| 7,276,614 | B2 | 10/2007 | Toma et al. |
| 7,279,587 | B2 | 10/2007 | Odell et al. |
| 7,293,868 | B2 | 11/2007 | Odell et al. |
| 7,317,122 | B2 | 1/2008 | Carlini et al. |
| 7,323,498 | B2 | 1/2008 | Belelie et al. |

(Continued)

*Primary Examiner* — Alison L Hindenlang
*Assistant Examiner* — Mohamed K Ahmed Ali
(74) *Attorney, Agent, or Firm* — Nitin N. Joshi

(57) ABSTRACT

A composition suitable for forming a support using a three-dimensional (3D) deposition method is presented. The composition includes a wax including at least one functional group capable of reacting with a build material used in the 3D deposition method, when exposed to an actinic radiation, wherein the functional group is itself substantially non-reactive to the actinic radiation. A method of forming a three dimensional (3D) article is also presented.

14 Claims, 5 Drawing Sheets

(56) References Cited

U.S. PATENT DOCUMENTS

| | | |
|---|---|---|
| 7,378,460 B2 | 5/2008 | Schmidt et al. |
| 7,384,463 B2 | 6/2008 | Norsten et al. |
| 7,449,515 B2 | 11/2008 | Belelie et al. |
| 7,459,014 B2 | 12/2008 | Breton et al. |
| 7,479,510 B2 | 1/2009 | Napadensky et al. |
| 7,531,582 B2 | 5/2009 | Toma et al. |
| 7,538,145 B2 | 5/2009 | Belelie et al. |
| 7,541,406 B2 | 6/2009 | Banning et al. |
| 7,553,011 B2 | 6/2009 | Odell et al. |
| 7,556,844 B2 | 7/2009 | Iftime et al. |
| 7,559,639 B2 | 7/2009 | Belelie et al. |
| 7,563,489 B2 | 7/2009 | Carlini et al. |
| 7,578,587 B2 | 8/2009 | Belelie et al. |
| 7,625,956 B2 | 12/2009 | Odell et al. |
| 7,632,546 B2 | 12/2009 | Odell et al. |
| 7,674,842 B2 | 3/2010 | Belelie et al. |
| 7,683,102 B2 | 3/2010 | Odell et al. |
| 7,691,920 B2 | 4/2010 | Belelie et al. |
| 7,699,922 B2 | 4/2010 | Breton et al. |
| 7,714,040 B2 | 5/2010 | Toma et al. |
| 7,754,779 B2 | 7/2010 | Odell et al. |
| 7,812,064 B2 | 10/2010 | Odell et al. |
| 7,820,731 B2 | 10/2010 | Odell et al. |
| 7,836,573 B2 | 11/2010 | Lukis et al. |
| 7,934,823 B2 | 5/2011 | Belelie et al. |
| 8,047,235 B2 | 11/2011 | Lyons et al. |
| 8,084,637 B2 | 12/2011 | Chopra et al. |
| 8,236,870 B2 | 8/2012 | Breton et al. |
| 8,262,210 B2 | 9/2012 | Chretien et al. |
| 8,309,621 B2 | 11/2012 | Breton et al. |
| 8,470,231 B1 | 6/2013 | Dikovsky et al. |
| 2003/0092820 A1* | 5/2003 | Schmidt .............. B29C 67/0055 524/487 |
| 2004/0258729 A1 | 12/2004 | Czernuszka et al. |
| 2007/0259156 A1 | 11/2007 | Kempers et al. |
| 2009/0148813 A1 | 6/2009 | Sun et al. |
| 2010/0288194 A1* | 11/2010 | Stockwell ........... B29C 67/0059 118/313 |
| 2011/0262711 A1 | 10/2011 | Chopra et al. |
| 2012/0086761 A1 | 4/2012 | Chrítien et al. |
| 2012/0092426 A1 | 4/2012 | Chopra et al. |
| 2012/0128881 A1 | 5/2012 | Faucher et al. |
| 2012/0129754 A1 | 5/2012 | Prozzo et al. |
| 2012/0157562 A1 | 6/2012 | Chopra et al. |
| 2012/0178845 A1* | 7/2012 | Napadensky ....... B29C 67/0059 522/96 |
| 2012/0224011 A1 | 9/2012 | Chrétien et al. |
| 2013/0026683 A1 | 1/2013 | Ng et al. |
| 2013/0236706 A1 | 9/2013 | Xu et al. |

\* cited by examiner

Step 1

Step 2

Step 3

US 9,873,798 B2

COMPOSITION AND METHOD FOR USE IN THREE DIMENSIONAL PRINTING

BACKGROUND OF THE INVENTION

The invention relates generally to support compositions and methods of forming three-dimensional (3D) articles using these support compositions. More particularly, the invention relates to support compositions for ink-jet printing and ink-jet printing of 3D articles using these support compositions.

Typical ink-jettable 3D printing materials and methods result in rough surfaces due to intermixing of support material with build material at the interface. The support material that is mixed with the build material at the interface is typically extracted when the support is removed, resulting in a rough surface. Surface roughness may not be desirable as it could lead to a matte finish. Further, surface roughness may diminish the average thickness of printed articles having thin walls, and may contribute to the formation of open porosity. The open porosity in turn may necessitate the use of additional processing steps, which may complicate the fabrication process and contribute to poor yields.

Thus there is a need for improved support compositions for ink-jet printing of 3D articles. Further, there is a need for improved 3D ink-jet printing methods.

BRIEF DESCRIPTION OF THE INVENTION

One embodiment is directed to a composition suitable for forming a support using a three-dimensional (3D) deposition method. The composition includes a wax including at least one functional group capable of reacting with a build material used in the 3D deposition method, when exposed to an actinic radiation, wherein the functional group is itself substantially non-reactive to the actinic radiation.

Another embodiment of the invention is directed to a composition suitable for forming a support using a three-dimensional (3D) deposition method. The composition includes a wax including at least one functional group comprising vinyl ether, maleate, fumarate, cinnamate, cinnamide, or combinations thereof, wherein the composition is substantially free of a photoinitiator.

Another embodiment of the invention is directed to a method of forming a three dimensional (3D) article. The method includes: (i) selectively depositing a build material on a substrate to form a plurality of build layers; (ii) selectively depositing a support composition on the substrate to form a plurality of support layers, wherein the support composition comprises a wax comprising at least one functional group; (iii) exposing the plurality of support layers and the plurality of build layers to an actinic radiation; and (iv) reacting a portion of the functional group in the support composition with a portion of the build material at an interface of the plurality of build layers and the plurality of support layers, wherein a portion of the support composition is substantially unreacted after exposure to the actinic radiation.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
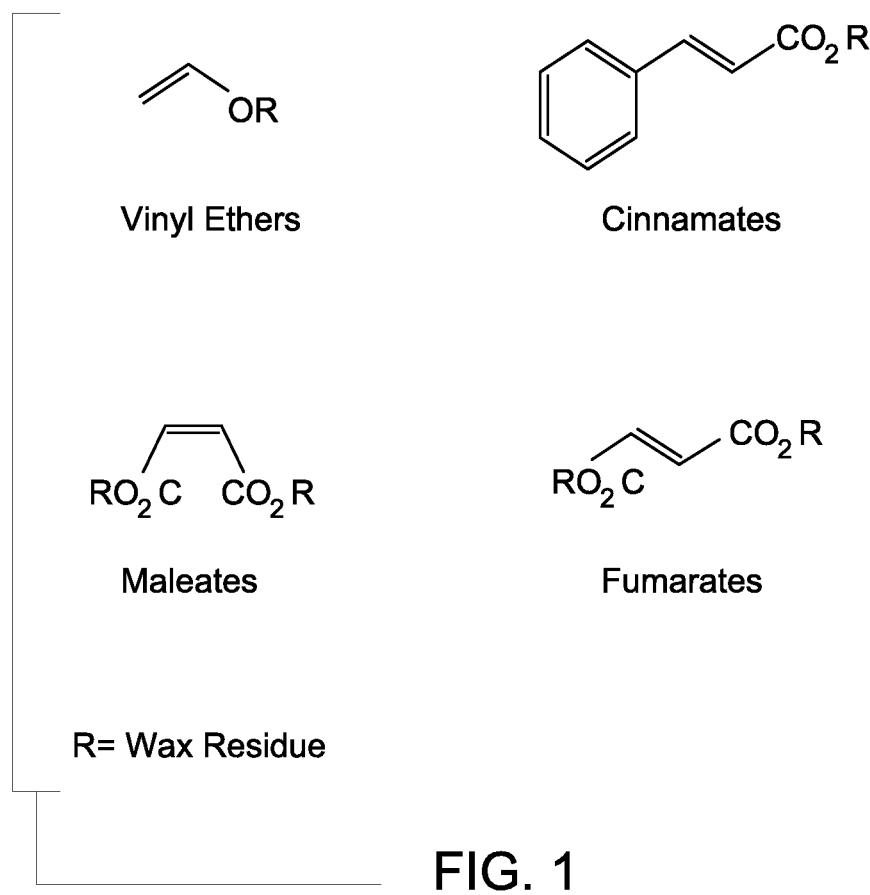
FIG. 1 illustrates the chemical structures of some example functional groups, according to an embodiment of the invention.

As discussed in detail below, some of the embodiments of the invention include support compositions and methods of forming 3D articles using these support compositions. More particularly, the invention relates to support compositions for ink-jet printing and ink-jet printing of 3D articles using these support compositions.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As mentioned earlier, typical 3-D inkjet printing methods may result in rough surfaces, which may not be desirable. The surface roughness may be caused by the intermixing of the build and support materials in the interface region. In some 3D-printing methods, both the build and support materials are deposited in the molten state in which they are highly miscible, thus mixing at the interface. Further mixing may occur during the planarization step, after each layer is printed with the ink-jetting system, and before the UV-curing step. Thus, once a region of mixed support wax and build material is formed and the part is UV cured, subsequent thermal dewaxing and cleaning with solvents may remove the support wax domains in this intermix region, leaving behind a rough, porous surface. Since support wax is typically used on both sides of the build material, the die walls may be affected considerably.

Embodiments of the invention described herein address the noted shortcomings of the state of the art. Some embodiments present a support composition including a wax material having at least one functional group that is reactive with the build material, while itself being substantially non-reactive to the ultra violet (UV) radiation. Without being bound by any theory, it is believed that the use of a reactive functional wax may result in the formation of a cross-linked, non-extractable region at the interface between the build and support materials, thereby avoiding removal of the support material at the interface and the formation of a rough, porous surface. Further, by using a functional group that is itself substantially non-reactive to the UV radiation, the bulk of the support material may remain substantially non-cross-linked, and may be easily removed.

In one embodiment, a composition suitable for forming a support using a three-dimensional (3D) deposition method is presented. The composition includes a wax including at least one functional group capable of reacting with a build material used in the 3D deposition method, when exposed to an actinic radiation.

The term "3D deposition method" as used herein refers to a process for the building of a 3D object from a digital model by successive deposition of layers. The terms "3D deposition method" and "additive manufacturing" are sometimes used in the art interchangeably. The 3D deposition method as described herein may be used anywhere throughout a product life cycle, for example, in pre-production (sometimes referred to as rapid prototyping), in full-scale production (sometimes referred to as rapid manufacturing), in tooling applications, in post-production customization, or in combinations thereof. In certain embodiments, a composition suitable for forming a support using a 3D ink-jet printing method is presented. In 3D ink-jet printing, a build material (in liquid or powder form), which is curable by actinic radiation, is deposited layer by layer using a 3D ink-jet printer to form a 3D article.

The term "actinic radiation" as used herein refers to electromagnetic radiation that can produce photochemical reactions. In certain embodiments, actinic radiation includes ultra-violet (UV) radiation having a wavelength in a range from about 10 nanometers to about 400 nanometers.

The term "build material" as used herein refers to the material used to form the structure of the 3D article. The build material includes a material that may be partially or substantially cured or cross-linked on exposure to actinic radiation. In some embodiments, any suitable curable material known to one of ordinary skill in the art and not inconsistent with the objectives of the present invention may be included in a build material as described herein.

In some embodiments, the build material may include one or more reactive groups capable of undergoing a partial or substantial cross-linking reaction on exposure to actinic radiation. In some embodiments, the build material may include one or more UV cross-linkable reactive groups. In some embodiments, the build material may include one or more olefins. In certain embodiments, the build material includes at least one reactive group including an acrylate moiety, a methacrylate moiety, or combinations thereof.

In some embodiments, the build material may include a mixture of monomers, oligomers, and polymers functionalized with acrylate moieties, methacrylate moieties, or combinations thereof. In some embodiments, the build material may include one or more urethane acrylate materials. Non-limiting example of a suitable build material includes Visi-Jet® MX build material commercially available from 3D Systems.

The composition used to build the 3D article further includes at least one suitable photoinitiator. The build material can polymerize and/or cross-link in the presence of the photoinitiator when exposed to the actinic radiation. Further, as noted earlier, the functional group in the wax can react with the build material in the presence of the photoinitiator, when exposed to the actinic radiation. In some embodiments, the composition used to build the 3D article may further include additional components, such as, for example, diluents, adhering agents, waxes, photo initiators, and the like.

The term "support" as used herein refers to one or more layers of a support material used to provide structural support to the plurality of layers of build material, during the fabrication of the 3D article. As alluded to previously, the support material includes a wax including at least one functional group capable of reacting with the build material, when exposed to the actinic radiation used for curing of the build material. In some embodiments, the functional group in the wax is capable of reacting with the build material in the presence of a photoinitiator typically used for curing of the build material, and subsequent formation of the 3D article.

The term "wax" as used herein refers to an organic compound or a mixture of organic compounds having a melting temperature greater than 40° C. The organic compound may be naturally occurring or synthetic. Non-limiting examples of a suitable wax include a hydrocarbon wax, a fatty ester wax, a fatty amide wax, a hydrogenated wax, a microcrystalline wax, a paraffin wax, or combinations thereof.

In some embodiments, a suitable wax includes a fatty ester wax derived from an alcohol and a fatty acid or its derivative (for example, anhydride, acid chloride etc.). In some embodiments, suitable fatty acids and their derivatives may include aliphatic chains having greater than 6 carbon atoms. In some embodiments, suitable fatty acids and their derivatives may include aliphatic chains having greater than 13 carbon atoms. Further, the functional group (as described later) may be present in the fatty acid, in the alcohol, or combinations thereof. In some embodiments the alcohol may include the suitable functional group (for example, vinyl ether). Non-limiting examples of suitable fatty acids include octadecanoic acid, octadecandioic acid, eicosanedioic acid, or combinations thereof. Non-limiting examples of a suitable alcohol include hydroxybutylvinyl ether, cyclohexanedimethanol monovinyl ether, or combinations thereof.

In some embodiments, a suitable wax includes a fatty ester wax derived from a fatty alcohol and an acid or its derivative (for example, anhydride, acid chloride etc.). In some embodiments, suitable fatty alcohols may include aliphatic chains having greater than 6 carbon atoms. In some embodiments, suitable fatty alcohols may include aliphatic chains having greater than 13 carbon atoms. Non-limiting examples of suitable fatty alcohols include hexadecanol, octadecanol, or combinations thereof. In some embodiments the acid may include the suitable functional group (for example, maleic acid or fumaric acid). Non-limiting examples of suitable acid derivatives include maleic anhydride, fumaryl chloride, or combinations thereof.

In some embodiments, a suitable wax includes a fatty amide wax derived from a long chain amine and an acid chloride. Non-limiting examples of suitable amines include octadecylamine, hexadecylamine, dodecylamine, or combinations thereof. In some embodiments, a fatty amine wax may include a cinnamide wax. In certain embodiments, the wax includes a cinnamide, such as, for example, dodecyl cinnamide, octadecyl cinnamide, or combinations thereof. In certain embodiments, the wax includes a fatty ester derived from a hydroxybutyl vinyl ether.

As noted earlier, the wax includes a functional group capable of reacting with a build material used in the 3D deposition method, when exposed to an actinic radiation. The term "capable of reacting" as used in this context means that the functional group in the wax undergoes one or both of a polymerization reaction and a cross-linking reaction, when the wax is exposed to the actinic radiation in the presence of the build material and a photoinitiator. In some embodiments, the wax includes a functional group capable of reacting with the build material when exposed to ultra violet radiation. In some embodiments, the wax includes a functional group capable of reacting with the build material under free radical polymerization conditions.

As mentioned previously, the functional group is itself substantially non-reactive to the actinic radiation. The term "substantially non-reactive" as used in this context means that less than 5 mole percent of the functional group in the wax undergoes one or both of a polymerization reaction and cross-linking reaction, when the wax is exposed to the actinic radiation by itself, in the absence of a photoinitiator. In some embodiments, the wax includes a functional group that is substantially non-reactive when exposed to ultra violet radiation. In some embodiments, the wax includes a functional group that is substantially non-reactive under free radical polymerization conditions.

Thus, the functional group is substantially non-reactive when exposed to the actinic radiation, but when exposed to the actinic radiation in the present of the build material and the photoinitiator, the functional group reacts with one or more reactive groups in the build material to form a cross-linked material. Some embodiments present a support composition including a wax material having at least one functional group that does not substantially homopolymerize under free-radical initiated polymerization conditions (particularly, in the absence of a photoinitiator), but is capable of co-polymerizing with acrylates and methacrylates (for example, present in the build material) in the presence of a photoinitiator.

In some embodiments, the functional group includes vinyl ether. In some embodiments, the functional group includes maleate, fumarate, cinnamate, cinnamide, or combinations thereof. FIG. 1 depicts the chemical structures of some example functional groups. In some embodiments, the wax may include a plurality of functional group types. Thus by way of example, in some embodiments the wax may include both vinyl ether and cinnamide functional groups. In some embodiments, the wax may include both maleate and cinnamide functional groups.

The number of functional groups present in the wax may depend on one or more of the functional group type, the build material, the reaction conditions, the level of cross-linking desired, and the solvent used for support structure removal. In some embodiments, the wax may include a functional group present in an amount sufficient to provide the desired cross-linking in the interface region between the support and build materials, such that the cross-linked interface region is substantially resistant to the solvent used for removing the support. Further, it is desirable that the wax includes a functional group present in an amount such that the desired melting/resolidification characteristics (as described in detail below) are not affected significantly.

In some embodiments, the number of functional groups in the wax is in a range from about 1 to about 6. In some embodiments, the number of functional groups in the wax is in a range from about 2 to about 4. In some embodiments, the number of functional groups in the wax is in a range from about 2 to about 3.

In some embodiments, a monomer may be added to the support composition, in addition to the functionalized wax, to provide the desired cross-linking density at the interface between the build and support materials. As noted previously, with respect to the functional group, the monomer is desirably capable of reacting with a build material but is itself substantially non-reactive, when exposed to an actinic radiation. The term "capable of reacting" as used in this context means that the monomer undergoes one or both of a polymerization reaction and a cross-linking reaction when the monomer is exposed to the actinic radiation in the presence of the build material and a photoinitiator. The term "substantially non-reactive" as used in this context means that less than 5 mole percent of the monomer undergoes a polymerization or cross-linking reaction when the monomer is exposed to the actinic radiation by itself, in the absence of a photoinitiator. In some embodiments, a suitable monomer may include an acrylate moiety, a methacrylate moiety, a vinyl ether moiety, a maleate moiety, a fumarate moiety, a cinnamide moiety, a cinnamate moiety, or combinations thereof.

As noted earlier, the support composition, as described herein, is substantially non-curable or does not polymerize or polymerize substantially when exposed to actinic radiation. In some embodiments, the support composition is substantially free of a photoinitiator. The term "substantially free" as used in this context means that the support composition includes less than 0.5 weight percent of the photoinitiator based on the total weight of the support composition. In some embodiments, the support composition is completely free of the photoinitiator.

As the support composition itself does not include a photoinitiator, the bulk of the support composition remains substantially un-reacted, after exposure to the actinic radiation used for formation of the 3D article. However, the support composition at the interface between the build layers and the support layers reacts with the build material in the presence of the photoinitiator present in the build composition, to form a cross-linked material. Without being bound by any theory, it is believed that the use of support composition including a reactive functional wax may result in the formation of a cross-linked, non-extractable region at the interface between the build and support materials, thereby avoiding removal of the support material at the interface and the formation of a rough, porous surface. Further, by using a support composition that is itself substantially non-reactive to the UV radiation, the bulk of the support material remains non-crosslinked and may be easily removed.

The amount of wax in the support composition described herein may depend on one or more of: the jetting temperatures of the 3D printing system, the desired viscosity of the support composition, the required mechanical integrity of the support material for printing applications, and the deposition rates of the build material and the support material. In some embodiments, the amount of wax in the support composition is in range from about 50 weight percent to about 99 weight percent. In some embodiments, the amount of wax in the support composition is in range from about 60 weight percent to about 98 weight percent. In some embodiments, the amount of wax in the support composition is in range from about 70 weight percent to about 95 weight percent.

As noted earlier, in some embodiments the composition is suitable for forming a support using ink-jet 3D printing. A composition suitable for forming the support using ink-jet 3D printing may further have one or more of the following characteristics: a melting temperature in a range from about 40 degrees Celsius to about 110 degrees Celsius, a resolidification temperature in a range from about 30 degrees Celsius to about 100 degrees Celsius, rapid solidification rate on cooling, reproducible melt/resolidification behavior, thermal stability in the melt, and mechanical integrity as a film.

In some embodiments, a support composition described herein has melting and resolidification temperatures over a broad range of temperatures applicable to 3D printing systems. In some embodiments, the support composition has a melting temperature in a range from about 40 degrees Celsius to about 110 degrees Celsius. In some embodiments, the support composition has a melting temperature in a range from about 50 degrees Celsius to about 95 degrees Celsius. In some embodiments, the support composition has a resolidification temperature in a range from about 30 degrees Celsius to about 100 degrees Celsius. In some embodiments, the support composition has a resolidification temperature in a range from about 40 degrees Celsius to about 80 degrees Celsius.

In some embodiments, the support composition has a viscosity consistent with the requirements and parameters of one or more 3D printing systems. In some embodiments, the support composition described herein has a viscosity in a range from about 9 centipoise to about 16 centipoise at a temperature of about 80° C. In some embodiments, the support composition described herein has a viscosity in a range from about 12 centipoise to about 15 centipoise at a temperature of about 80° C.

A method of forming a three dimensional (3D) article is also presented. The method includes selectively depositing a build material on a substrate to form a plurality of build layers. In some embodiments, the layers of the build material may be deposited according to an image of the three dimensional article in a computer readable format. In some embodiments, a preselected amount of a build material described herein is heated to the appropriate temperature, and may be jetted through the print head or a plurality of print heads of a suitable inkjet printer to form a layer on the substrate. In some embodiments, each layer of the build material may be deposited according to the preselected CAD parameters.

In some embodiments, the build material solidifies upon deposition. In some embodiments, the build material remains substantially fluid upon deposition. In some embodiments, the temperature of the build environment may be controlled such that the jetted droplets of the build material solidify on contact with the receiving surface. In other embodiments, the jetted droplets of build material may not solidify on contact with the receiving surface, remaining in a substantially fluid state.

In some embodiments, a method of printing a three dimensional article includes supporting at least one of the layers of the build material with a support composition. Accordingly, the method further includes selectively depositing a support composition on the substrate to form a plurality of support layers. As described in the detail earlier, the support composition includes a wax including at least one functional group.

The support composition, in some embodiments, may be deposited in a manner consistent with that described herein for the build material. The support composition, for example, may be deposited according to the preselected CAD parameters such that the support material is adjacent or continuous with one or more layers of the build material. Jetted droplets of the support composition, in some embodiments, may solidify or freeze on contact with the receiving surface. In other embodiments, the jetted droplets of support material may not solidify on contact with the receiving surface, remaining in a substantially fluid state. Layered deposition of the build material and support material may be repeated until the three dimensional article shape has been formed.

In some embodiments, the method of forming a three dimensional (3D) article further includes exposing the plurality of support layers and the plurality of build layers to an actinic radiation. In some embodiments, the method further includes subjecting the build material to actinic radiation (for example, UV radiation) of sufficient wavelength and intensity to cure the build material. In some embodiments, the plurality of build and support layers may be deposited in the shape of a 3D article and then exposed to the actinic radiation. In some other embodiments, the layers of deposited build and support materials may be exposed to actinic radiation and cured, prior to the deposition of adjacent layers.

In some embodiments, the deposited build and support layers may be further subjected to one or more planarization steps. Planarization may correct the thickness of one or more layers, prior to curing the material by flattening the dispensed material to remove excess material, and create a substantially uniformly smooth exposed surface. In some embodiments, the method further includes subjecting the plurality of build layers and the plurality of support layers to a planarization step after the step of depositing the layers. In some embodiments, after each layer is deposited, the deposited material (build and support material) is planarized and cured with actinic (for example, UV) radiation prior to the deposition of the next layer. In some other embodiments, several layers may be deposited before planarization and curing, or multiple layers may be deposited and cured followed by one or more layers being deposited and then planarized without curing.

As mentioned earlier, the support composition includes a wax including a functional group capable of reacting with the build material when exposed to an actinic radiation. In some instances, a portion of the support composition and the build material may intermix at the interface of the support layers and the build layers, for example, during one or both of the deposition and planarization steps. Thus, in some such instances, an interface region may be formed including at least a portion of the build composition (including the build material and photoinitiator) and the support composition.

The method further includes reacting a portion of the functional group in the support composition with a portion of the build material at an interface of the plurality of build layers and the plurality of support layers. Further, as the functional group and the support composition are themselves substantially non-reactive to the actinic radiation, a portion of the support composition is substantially unreacted after exposure to the actinic radiation. The term "substantially unreacted" as used in this context means that less than 5 weight percent of the total amount of support composition (present in the one or more support layers) undergoes a polymerization or cross-linking reaction, when the build and support layers are exposed to the actinic radiation.

Thus, the method includes forming a substantially non-removable cross-linked region at the interface between the build and support layers, while the bulk of the support layers is substantially un-crosslinked and easily removable. In some embodiments, the method further includes removing a portion of the support composition that is substantially unreacted after exposure to the actinic radiation. The support composition may be removed by any means known to one of ordinary skill in the art and not inconsistent with the objectives of the present invention. In some embodiments, the support composition may be removed by melting, dissolution in a solvent, or combinations thereof.

In some embodiments, a portion of the unreacted composition may be removed by melting, followed by dissolving the residual unreacted support composition in a suitable solvent. In some embodiments, the method further includes contacting at least a portion of plurality of support layers with a solvent. In some such instances, a portion of the support composition that is unreacted is substantially removed, and the portion of the support composition that has reacted with the build material is substantially retained in the 3D article. The term "substantially removed" as used in this context means that greater than 90 weight percent of the unreacted support composition is removed (for example, by melting or solubilizing). The term "substantially retained" as used in this context means that greater than 90 weight percent of the reacted support composition is retained after the support removal step (for example, melting or solubilizing step). As mentioned earlier, the compositions and methods described herein may avoid formation of a rough, porous surface in a 3D ink-jet printed article.

EXPERIMENTAL

Example 1 Synthesis of Functional Waxes

All reactions were carried out under nitrogen unless otherwise specified. Reagents were used as received from the suppliers. Yields were not optimized.

Synthesis of 4-vinyloxybutyl octadecanoate (Sample 1): 1.9 mL of dicyclohexylcarbodiimide in 2 mL methylene chloride was added dropwise to a solution of 1.0 g stearic acid, 0.41 g hydroxybutyl vinyl ether, and 0.14 g dimethylaminopyridine in 7 mL methylene chloride. After reacting overnight at room temperature, the mixture was filtered to remove solids. The resulting solution was then stripped on a rotary evaporator. The crude product was recrystallized twice from ethanol. The result was 0.93 g of product as a white solid. $^1$H NMR (CDCl$_3$) δ 6.45 (dd, J=14.4, 6.8 Hz, 1H), 4.15 (dd, J=14.4, 2.0 Hz, 1H), 4.09 (m, 2H), 3.97 (dd, J=6.8, 2.0 Hz, 1H), 3.69 (m, 2H), 2.28 (t, J=7.4 Hz, 2H), 1.72 (m, 4H), 1.60 (m, 2H), 1.21-1.34 (m, 28H), 0.87 (t, J=7.0 Hz, 3H). $^{13}$C NMR 173.92, 151.78, 86.40, 67.27, 63.84, 34.36, 31.93, 29.70, 29.66, 29.61, 29.48, 29.37, 29.27, 29.17, 25.66, 25.37, 25.00, 22.70, 14.12.

Synthesis of di(4-vinyloxybutyl) octadecanedioate (Sample 2): 1.3 mL of diisopropylcarbodiimide was added dropwise to a solution of 0.50 g octadecandioic acid, 0.37 g hydroxybutyl vinyl ether, and 0.39 g dimethylaminopyridine in 12 mL methylene chloride. The result was then allowed to stir overnight at room temperature. The reaction mixture was then filtered to remove solids, washed 2× with 5% HCl, once with saturated sodium bicarbonate, and dried over anhydrous potassium carbonate. The solvent was removed on a rotary evaporator to yield 0.8 g of crude product as a white solid. Purification was accomplished by recrystallization from methanol. After drying in a vacuum oven at room temperature, 0.45 g pure solid was obtained. $^1$H NMR (CDCl$_3$) δ 6.45 (dd, J=14.4, 6.8 Hz, 2H), 4.15 (dd, J=14.4, 1.9 Hz, 2H), 4.09 (m, 4H), 3.97 (dd, J=6.8, 1.9 Hz, 2H), 3.69 (m, 4H), 2.28 (t, J=7.5 Hz, 4H), 1.72 (m, 8H), 1.60 (m, 4H), 1.21-1.32 (m, 24H). $^{13}$C NMR 173.92, 151.78, 86.40, 67.27, 63.84, 34.35, 29.67, 29.64, 29.60, 29.47, 29.27, 29.16, 25.65, 25.37, 25.00.

Synthesis of di(4-vinyloxybutyl) eicosanedioate (Sample 3): 1.4 mL of diisopropylcarbodiimide mixed with 2 mL CH$_2$Cl$_2$ was added drop-wise to a solution of 1.0 g eicosandioic acid, 0.75 g hydroxybutyl vinyl ether, and 0.7 g dimethylaminopyridine in 10 mL methylene chloride. The result was then allowed to stir for 4.5 hours at room temperature. The reaction mixture was then filtered to remove solids, washed 2× with 5% HCl, once with 5% NaOH, once with saturated NaCl and dried over anhydrous potassium carbonate. After stripping of the solvent on a rotary evaporator, 1.15 g of crude product was obtained. The material was then recrystallized from ethanol yielding 0.90 g of pure product after drying. $^1$H NMR (CDCl$_3$) δ 6.46 (dd, J=14.4, 6.8 Hz, 2H), 4.16 (dd, J=14.4, 2.0 Hz, 2H), 4.10 (m, 4H), 3.98 (dd, J=6.8, 2.0 Hz, 2H), 3.70 (m, 4H), 2.29 (t, J=7.6 Hz, 4H), 1.73 (m, 8H), 1.61 (m, 4H), 1.21-1.32 (m, 28H). $^{13}$C NMR 173.94, 151.79, 86.42, 67.29, 63.85, 34.37, 29.69, 29.66, 29.61, 29.48, 29.27, 29.17, 25.66, 25.37, 25.00.

Synthesis of di(vinyloxymethylcyclohexylmethyl) eicosanedioate (Sample 4): 7 mL of diisopropylcarbodiimide mixed with 10 mL CH$_2$Cl$_2$ was added drop wise to a solution of 5.0 g eicosandioic acid, 5.1 mL cyclohexanedimethanol monovinyl ether, and 3.5 g dimethylaminopyridine in 75 mL methylene chloride. After stirring overnight the mixture was filtered into a separatory funnel and washed with water, dilute HCl, and saturated NaHCO$_3$. After drying over K$_2$CO$_3$ the solvent was removed on a rotary evaporator. The result was crystallized with ethanol and then recrystallized from ethanol/CH$_2$Cl$_2$. After drying, 3.5 g of product was obtained. $^1$H NMR (CDCl$_3$) δ 6.43 (dd, J=14.4, 6.8 Hz, 2H), 4.12 (dd, J=14.4, 2.0 Hz, 2H), 3.92 (dd, J=6.8, 2.0 Hz, 2H), 3.86 (d, J=6.5 Hz, 4H), 3.46 (d, J=6.4 Hz, 4H), 2.27 (t, J=7.4 Hz, 4H), 1.80 (m, 8H), 1.58 (m, 10H), 1.2-1.3 (m, XH), 0.98 (m, YH). $^{13}$C NMR 173.92, 152.07, 86.07, 73.29, 69.18, 37.49, 37.16, 34.34, 29.67, 29.64, 29.59, 29.46, 29.25, 29.15, 28.98, 28.25, 25.02.

Synthesis of octadecyl cinnamide (Sample 5): 6.2 g cinnamoyl chloride in 20 mL methylene chloride was added to an ice cold solution of 10.0 g octadecylamine and 5.4 mL triethylamine in 70 mL methylene chloride over a period of about 30 minutes. An additional 40 mL CH$_2$Cl$_2$ was added during this time in order to maintain adequate stirring. Once addition was complete, the addition funnel was rinsed with a few mLs of solvent. Then the reaction was allowed to warm to room temperature where it was kept overnight. At this point the mixture was filtered to remove solids and then washed with ~2% HCl, water and saturated sodium bicarbonate. After drying over K$_2$CO$_3$, the solvent was stripped on a rotary evaporator. The result was 12.65 g of crude product as a white solid. This was recrystallized from ethanol and then dried at room temperature to form 11.43 g of pure product. $^1$H NMR (CDCl$_3$) δ 7.62 (d, J=15.6 Hz, 1H), 7.49 (m, 2H), 7.35 (m, 3H), 6.40 (d, J=15.6 Hz, 1H), 5.74 (br t, J=5.2 Hz, 1H), 3.38 (q, J=6.8 Hz, 2H), 1.56 (quintet, J=7.2 Hz, 2H), 1.23-1.33 (m, 30H), 0.88 (t, J=6.6 Hz, 3H). $^{13}$C NMR 165.84, 140.29, 134.92, 129.58, 128.79, 127.75, 120.84, 39.84, 31.94, 29.71, 29.67, 29.62, 29.57, 29.38, 29.35, 27.00, 22.71, 14.14.

Synthesis of hexadecyl cinnamide (Sample 6): 4.8 g cinnamoyl chloride in 15 mL methylene chloride was added to an ice cold solution of 7.0 g hexadecylamine, 4.3 mL triethylamine and 75 mL methylene chloride over a period of about 30 minutes. Once the addition was complete, the addition funnel was rinsed with a few mLs of solvent. Then the reaction was allowed to warm to room temperature where it was kept overnight. At this point the mixture was filtered to remove solids and then washed with ~2% HCl, water and saturated sodium bicarbonate. After drying over $K_2CO_3$, the solvent was stripped on a rotary evaporator to form 10.87 g of crude product as a white solid. This was recrystallized from ethanol and then dried in a vacuum oven at 40-45° C. to obtain 9.16 g of pure product. $^1$H NMR (CDCl$_3$) δ 7.62 (d, J=15.6 Hz, 1H), 7.48 (m, 2H), 7.33 (m, 3H), 6.43 (d, J=15.6 Hz, 1H), 5.93 (br t, J=5.2 Hz, 1H), 3.37 (q, J=6.8 Hz, 2H), 1.56 (quintet, J=7.2 Hz, 2H), 1.22-1.36 (m, 26H), 0.87 (t, J=7.0 Hz, 3H). $^{13}$C NMR 165.92, 140.72, 134.93, 129.55, 128.78, 127.75, 120.93, 39.85, 31.94, 29.72, 29.67, 29.62, 29.58, 29.38, 29.37, 27.02, 22.71, 14.14.

Synthesis of dodecyl cinnamide (Sample 7): A solution of 5.0 g cinnamoyl chloride in 20 mL methylene chloride was added to an ice cold solution of 5.7 g dodecylamine over a period of about 30 minutes. Once the addition was complete, the addition funnel was rinsed with a few mLs of solvent. Then the reaction was allowed to warm to room temperature where it was kept overnight. At this point, the mixture was filtered to remove solids and then washed with ~2% HCl, water and saturated sodium bicarbonate. After drying over $K_2CO_3$, the solvent was stripped on a rotary evaporator. The material was recrystallized from ethanol and then dried in a vaccum oven at 40-45° C. There were thus obtained 5.69 g of pure product. $^1$H NMR (CDCl$_3$) δ 7.61 (d, J=15.6 Hz, 1H), 7.46 (m, 2H), 7.30 (m, 3H), 6.49 (d, J=15.6 Hz, 1H), 6.35 (br t, J=5.6 Hz, 1H), 3.36 (q, J=6.8 Hz, 2H), 1.56 (quintet, J=7.2 Hz, 2H), 1.20-1.37 (m, 18H), 0.87 (t, J=6.8 Hz, 3H). $^{13}$C NMR 166.12, 140.60, 134.94, 129.52, 128.76, 127.74, 121.07, 39.89, 31.93, 29.70, 29.67, 29.62, 29.59, 29.38, 29.37, 27.06, 22.70, 14.14.

Synthesis of di(hexadecyl) maleate (Sample 8): A mixture of 10.0 g hexadecanol, 2.0 g maleic anhydride, and 0.20 g toluenesulfonic acid monohydrate was heated to 105° C. under vacuum where it was kept for 20 hours. The mixture was then cooled and dissolved in chloroform. After washing with saturated sodium bicarbonate, the solution was dried over $K_2CO_3$ and stripped on a rotary evaporator. The solid product was then recrystallized twice from ethanol and dried in a vacuum oven. The final yield was 9.67 g of a light tan solid. $^1$H NMR (CDCl$_3$) δ 6.22 (s, 2H), 4.17 (t, J=6.8 Hz, 4H), 1.66 (quintet, J=6.8 Hz, 4H), 1.22-1.38 (m, 52H), 0.87 (t, J=6.8 Hz, 6H). 13C NMR 165.35, 129.76, 65.48, 31.94, 29.71, 29.69, 29.67, 29.59, 29.54, 29.38, 29.26, 28.44, 25.88, 22.70, 14.11.

Synthesis of di(octadecyl) maleate (Sample 9): A mixture of 10.0 g octadecanol, 1.8 g maleic anhydride, and 0.20 g toluenesulfonic acid monohydrate was heated to 120° C. under vacuum where it was kept for 2.5 hours. The mixture was then cooled and dissolved in a mix of hexanes and chloroform. After washing with saturated sodium bicarbonate, the solution was dried over $K_2CO_3$ and stripped on a rotary evaporator. The solid product was then crystallized twice from ethanol and dried in a vacuum oven. The final yield was 8.83 g of a light tan solid. $^1$H NMR (CDCl$_3$) δ 6.22 (s, 2H), 4.17 (t, J=6.8 Hz, 4H), 1.66 (quintet, J=7.0 Hz, 4H), 1.20-1.38 (m, 60H), 0.87 (t, J=6.8 Hz, 6H). $^{13}$C NMR 165.36, 129.76, 65.48, 31.94, 29.72, 29.67, 29.60, 29.54, 29.38, 29.27, 28.44, 25.88, 22.71, 14.13.

Synthesis of a difunctional wax (Sample 10): 2.0 g octadecylamine and 0.72 g maleic anhydride were heated to a melt and stirred for about 20 minutes. The result was cooled, and mixed with 10 mL $CH_2Cl_2$, 0.86 g hydroxybutyl vinyl ether, and 0.72 g dimethylaminopyridine. To the heterogeneous mix was added 1.7 mL of diisopropylcarbodiimide. The resulting mixture was then allowed to stir for 3 days at room temperature. At this point, the mixture was filtered into a separatory funnel and washed with dilute HCl, water, and saturated sodium bicarbonate. After drying over anhydrous $K_2CO_3$, the solvent was stripped on a rotary evaporator. The sample was then recrystallized from ethanol. NMR at this time showed it to still be somewhat impure and furthermore that the maleate olefin had isomerized to a fumarate (a coupling constant of 15.6 Hz was observed for this olefin which is consistent with a trans rather than cis isomer). A sample for DSC testing was purified by column chromatography using hexane:ethyl acetate as eluent. $^1$H NMR (CDCl$_3$) δ 6.90 (d, J=15.6 Hz, 1H), 6.80 (d, J=15.6 Hz, 1H), 6.45 (dd, J=14.4, 6.8 Hz, 1H), 6.08 (br t, J=5.4 Hz, 1H), 4.21 (t, J=6.4 Hz, 2H), 4.16 (dd, J=14.4, 2.0 Hz, 1H), 3.98 (dd, J=6.8, 2.0 Hz, 1H), 3.70 (t, J=6.0 Hz, 1H), 3.34 (q, J=6.8 Hz, 2H), 1.77 (m, 4H), 1.53 (quintet, J=7.2 Hz, 2H), 1.21-1.34 (m, 30H), 0.87 (t, J=6.6 Hz, 3H). $^{13}$C NMR 165.71, 163.51, 151.74, 136.63, 130.06, 86.51, 67.16, 64.82, 39.99, 31.93, 29.70, 29.67, 29.59, 29.54, 29.40, 29.37, 29.27, 26.92, 25.59, 25.29, 22.69, 14.13.

Synthesis of di(octadecyl) fumarate (Sample 11): 2.7 mL of fumaryl chloride was added to a mixture of 13.5 g octadecanol, 7.0 mL triethylamine, and 100 mL hexanes with stirring. Once the addition was complete, the reaction was heated to reflux for an hour. This was followed by cooling the mixture slightly and then filtering while still warm. The hexanes were stripped on a rotary evaporator yielding 11.42 g of crude product as a brown solid. The material was recrystallized from ethyl acetate to obtain 8.35 g of product as a tan solid. $^1$H NMR (CDCl$_3$) δ 6.84 (s, 2H), 4.19 (t, J=6.8 Hz, 4H), 1.67 (quintet, J=7.6 Hz, 4H), 1.2-1.4 (m, 60H), 0.88 (t, J=6.4 Hz, 6H). $^{13}$C NMR 165.12, 133.63, 65.53, 31.94, 29.71, 29.67, 29.64, 29.58, 29.51, 29.38, 29.23, 28.51, 25.88, 22.71, 14.13.

Synthesis of di(hexadecyl) fumarate (Sample 12): 2.7 mL of fumaryl chloride was added to a mixture of 12.1 g hexadecanol, 7.0 mL triethylamine, and 100 mL hexanes with stirring. Once the addition was complete, the reaction was heated to reflux for an hour. This was followed by cooling the mixture slightly and then filtering while still warm. On standing, the product was observed to crystallize from the hexanes. Therefore, the mix was placed on ice, and then the solid collected by vacuum filtration followed by washing with fresh, ice-cold hexanes. After drying in a vacuum oven, 10.0 g of product was obtained as an off-white solid. The material was further purified by recrystallization from ethyl acetate. The final yield was 8.9 g. $^1$H NMR (CDCl$_3$) δ 6.84 (s, 2H), 4.19 (t, J=6.8 Hz, 4H), 1.67 (quintet, J=6.8 Hz, 4H), 1.22-1.38 (m, 52H), 0.88 (t, J=6.6 Hz, 6H). $^{13}$C NMR 165.12, 133.63, 65.53, 31.94, 29.70, 29.67, 29.64, 29.57, 29.51, 29.38, 29.23, 28.51, 25.88, 22.71, 14.13.

Synthesis of a bifunctional wax oleyl cinnamide (Sample 13): A solution of 6.2 g cinnamoyl chloride in 25 mL chloroform was added drop-wise to an ice cold solution of 10.0 g oleylamine (tech, 70%), 5.4 mL triethylamine and 75 mL chloroform over a period of 30 minutes. Once the addition was complete, the reaction mixture was allowed to warm to room temperature where it was allowed to remain overnight. At this point, the mixture was washed 2× with dilute HCl, once with water and then with saturated sodium bicarbonate. It was then dried over $K_2CO_3$ and stripped on a rotary evaporator. 11.95 g of waxy solid was obtained on cooling. This material was then recrystallized from 70 mL ethanol to obtain 1.63 g of solid. NMR showed this to contain the right peaks but the oleyl olefin integration was only half of what it should be. Therefore, the resulting product was probably a mix of materials (as the starting oleylamine was only 70% pure). At this point, the liquid from the recrystallization was stripped under vacuum and the residue was recrystallized from 30 mL ethanol to obtain 1.89 g of the final product. $^1$H NMR (CDCl$_3$) δ 7.61 (d, 15.8 Hz, 1H), 7.46 (m, 2H), 7.31 (m, 3H), 6.45 (d, J=15.8 Hz, 1H), 6.17 (br t, J=5.2 Hz, 1H), 5.33 (m, 2H), 3.36 (q, J=7.2 Hz, 2H), 2.00 (m, 4H), 1.55 (quintet, J=6.8 Hz, 2H), 1.20-1.38 (m, 22H), 0.87 (t, J=6.8 Hz, 3H). 13C NMR 166.34, 140.38, 134.98, 129.92, 129.78, 129.44, 128.72, 127.73, 121.34, 39.94, 31.93, 29.79, 29.73, 29.64, 29.56, 29.54, 29.42, 29.35, 29.29, 27.23, 27.14, 22.71, 14.14.

Example 2: Melt/Resolidification Behavior Using DSC

Differential scanning calorimetry (DSC) studies were conducted on a Perkin Elmer DSC7. Samples were heated under nitrogen at 10° C./min from 20-30° C. up to 100-120° C. and then they were cooled back down to the original temperature at the same rate. Table 1 shows the results from the DSC study. In Table 1, the column labeled "melting peak" corresponds to the temperature at which the melt endotherm peaked on heating and the column labeled "resolidification peak" corresponds to the temperature at which the resolidification exotherm peaked on subsequent cooling. The "Delta" column shows the difference in temperature between the melting and resolidification peaks.

Example 3: Cure Screening Test

An acrylate masterbatch was prepared by mixing 17.52 g triethylene glycol dimethacrylate, 4.60 g SR349 (ethoxylated BPA diacrylate), 15.40 g Ebecryl 284N (acrylated aliphatic urethane), 2.52 g tripropylene glycol diacrylate, and 1.60 g of 1-hydroxycyclohexyl phenyl ketone (photoinitiator).

Test formulations were prepared by combining 0.95 g of masterbatch with 0.050 g of the test wax. After heating and stirring until homogeneous, the formulations were poured into disposable aluminum pans and the material (about 0.7-0.8 g) was spread into a thin film covering most of the bottom of the pan. An OmniCure® 52000 system manufactured by Lumen Dynamics (Ontario, Canada) was used as a UV light source for photo-curing. The 52000 was equipped with liquid light guides and a collimating adaptor at the end for uniform illumination of samples. The distance between the sample and end of the collimator was set to 4 inch. The cured films were broken up into small pieces and weighed into 8 dram vials. 10 mL of hexanes were added along with a magnetic stirbar and the vials were capped. They were then placed on a hotplate/stirrer and heated to ~45° C. with vigorous stirring for 2 hours. The solids were then filtered out using vacuum filtration, and washed with fresh hexanes. The combined hexanes solution was stripped on a rotary evaporator up to about 55-60° C./full house vacuum. The weight of the residue was then measured and then the residue was analyzed using proton NMR. The extractables values were calculated using the following formula:

% Extractables=(residue weight/initial sample weight)×100

Figure 2:
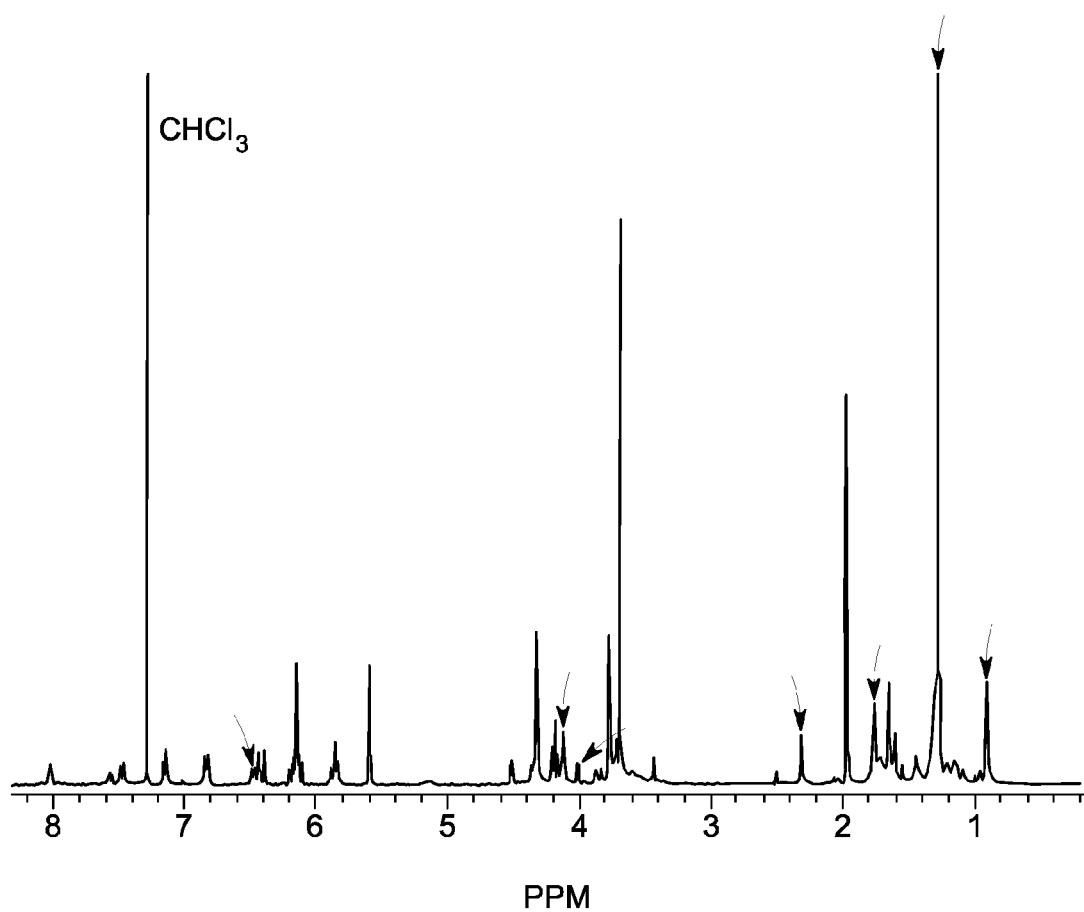
FIG. 2 illustrates proton NMR spectrum of extracts from a UV-cured support composition, according to an embodiment of the invention.

Table 1 shows the % extractable data for Samples 1-13. The extracted material for samples 1-13 was also characterized by proton NMR, and usually contained a mixture of unreacted wax, photoinitiator related peaks, and unreacted acrylates/methacrylates. FIG. 2 shows an example spectrum of the extracts from a formulation containing Sample 1. The peaks marked with arrows correspond to the wax, while the rest of the peaks correspond to ingredients from the acrylate formulation.

TABLE 1

Melting, resolidification and curing data for different waxes (Samples 1-13)

| Sample No. | Formula | Melting Peak (° C.) | Resolidification Peak (° C.) | Delta | % Extr. |
|---|---|---|---|---|---|
| 1 | $CH_3$—$(CH_2)_{16}$—$CO_2$—$(CH_2)_4$—O—CH=$CH_2$ | 44 | <20 | NA | 0.92 |
| 2 | $CH_2$=CH—O—$(CH_2)_4$—$O_2$C—$(CH_2)_{16}$—$CO_2$—$(CH_2)_4$—O—CH=$CH_2$ | 58 | 40 | 18 | 0.12 |
| 3 | $CH_2$=CH—O—$(CH_2)_4$—$O_2$C—$(CH_2)_{18}$—$CO_2$—$(CH_2)_4$—O—CH=$CH_2$ | 60 | 43 | 17 | 0.26 |
| 4 | [$CH_2$=CH—O—$CH_2$—$C_6H_{10}$—$CH_2$—$O_2$C—$(CH_2)_9$—]$_2$ | 45 | 24 | 21 | 1.2 |
| 5 | Ph—CH=CH—CONH—$(CH_2)_{17}CH_3$ | 89 | 77 | 12 | 0.78 |
| 6 | Ph—CH=CH—CONH—$(CH_2)_{15}CH_3$ | 88 | 75 | 13 | 1.1 |
| 7 | Ph—CH=CH—CONH—$(CH_2)_{11}CH_3$ | 76 | 51 | 25 | 0.48 |
| 8 | cis-$CH_3$—$(CH_2)_{15}$—$O_2$C—CH=CH—$CO_2$—$(CH_2)_{15}CH_3$ | 33 | 22 | 11 | 0.82 |
| 9 | cis-$CH_3$—$(CH_2)_{17}$—$O_2$C—CH=CH—$CO_2$—$(CH_2)_{17}CH_3$ | 45 | 36 | 9 | 0.18 |
| 10 | trans-$CH_2$=CH—O—$(CH_2)_4$—$O_2$C—CH=CH—CONH—$(CH_2)_{17}CH_3$ | 97 | 86 | 11 | NT |
| 11 | trans-$CH_3$—$(CH_2)_{17}$—$O_2$C—CH=CH—$CO_2$—$(CH_2)_{17}CH_3$ | 72 | 62 | 10 | 1.7 |
| 12 | trans-$CH_3$—$(CH_2)_{15}$—$O_2$C—CH=CH—$CO_2$—$(CH_2)_{15}CH_3$ | 65 | 55 | 10 | 1.8 |
| 13 | Ph—CH=CH—CONH—$(CH_2)_8$—CH=CH—$(CH_2)_7$—$CH_3$ | 43 | <20 | NA | 0.79 |

Samples 1-3 correspond to wax formulations functionalized with vinyl ethers prepared via esterification of fatty acids with hydroxybutyl vinyl ether (HBVE). Sample 1 (derived from stearic acid) had a low melting point (44° C.), but exhibited the desired extractable levels. Samples 2 and 3 had higher reactive olefin concentrations and provided better cure characteristics, as evidenced by their lower extractables levels. Further samples 2 and 3 exhibited melting/resolidification temperatures within the desired target ranges.

Sample 4 was prepared using cyclohexane dimethanol monovinyl ether (CHDMVE) instead of HBVE. DSC analysis of this material showed a multi-modal melting endotherm. This was likely due to the presence of cis and trans isomers from the CHDMVE. The melt and resolidification data in Table 1 reflects the properties of the main peak. As shown in Table 1, Sample 4 showed higher % extractable value when compared to Samples-13 and the melting temperature was lower.

As noted earlier, one of the desirable characteristics of the functionalized wax materials is that the wax itself should not be crosslinked by UV light. In order to evaluate this characteristic, each of the vinyl ether-functionalized materials (Samples 1-4) were cast into thin films and irradiated with UV light. The vinyl-ether functionalized waxes appeared to be largely unaffected by UV light, subsequent heating caused them to melt and flow like non cross-linked wax.

Samples 5-7 are cinnamide derivatives, prepared via the reaction of the requisite long chain primary amine with cinnamoyl chloride in the presence of triethylamine (Example 1). DSC analysis indicated that the melting points of Samples 5-7 were well within the desired range (as indicated in Table 1). Extractables testing indicated that these compounds reacted to a reasonable degree with the acrylate/methacrylate blend, although the results for hexadecyl cinnamide (Sample 6) were surprisingly high at 1.1%.

In order to determine whether a photodimerization reaction via a [2+2] cycloaddition is effected in cinnamide-functionalized waxes, a thin film was prepared from a mixture of Samples 4 and 5. This was irradiated with UV and then the film was dissolved in CDCl$_3$. Proton NMR analysis showed only the starting cinnamides, and [2+2] cycloaddition products were not identified. Thus, it appears that these materials do react during photolysis, and may be useful in support formulations.

Two long chain maleates, dihexadecyl maleate (Sample 8) and dioctadecyl maleate (Sample 9) were prepared by reacting maleic anhydride with two equivalents of either hexadecanol or octadecanol in the melt, under vacuum, with a catalytic amount of toluenesulfonic acid. The melting points for these materials were lower than desired. Further, the melting behavior of these materials changed after the first heat cycle. During the first heat-up, two melting endotherms were observed. However, on cooling only one resolidification exotherm was observed. During the second run, only single peaks for melting and resolidification were observed as the higher temperature melting peak seen in the first run had disappeared. Table 1 includes data from the second heating run for Samples 8 and 9. Table 1 further shows that the extractable levels were low, indicating desired curing characteristics.

Fumarates corresponding to the maleates (Samples 11 and 12) were prepared via a known procedure where hexadecanol and octadecanol were reacted with fumaryl chloride and triethylamine in hexanes. These two compounds, Samples 11 and 12 had melting points within the desired range. Further, the DSCs peaks were sharp and monomodal. Cure experiments however showed that the fumarates had higher extractable values than maleates.

Difunctional waxes (Samples 10 and 13) were prepared by using two different the olefin functional groups. The first compound, Sample 10 was prepared by first reacting maleic anhydride with one equivalent of octadecyl amine to form an amic acid. This was then reacted with HBVE in the same reaction vessel, cis maleate olefin isomerized to the trans fumarate olefin. This material exhibited sharp DSC peaks, and may be used as a blend with other functionalized waxes/monomers.

Sample 13 was prepared by reacting oleyl amine (tech grade only 70% pure) with cinnamoyl chloride. The melting point of this material was lower than desired, and addition of the extra olefin from the oleyl group did not improve the cure performance beyond what was observed for the monofunctional cinnamides.

Example 4: Mixture of Functionalized Wax with Monomer

As noted earlier, one of the desirable characteristics for a support wax formulation may be that they include sufficient functionality to provide a solvent resistant cross-linked network when co-reacted with the build material. However, waxes by their very nature (mostly straight chain hydrocarbons) may not contain sufficient functionality by themselves to provide the required level of cross-linking. Accordingly, one or more monomers may be added to the wax formulation increase the functionality. However, it is desirable that the monomer added does not have an overly large negative effect on the melting/resolidification temperatures of the waxes. In order to explore the impact of monomer addition, a series of blends were prepared and their melt and resolidification peaks measured. Table 2 shows the DSC peak temperature data for octadecyl cinnamide (Sample 5) with different amounts of cyclohexanedimethanol divinyl ether (CHDMDVE, a liquid), and octadecyl fumarate (Sample 11) with 20% bisphenol A dimethacrylate (BPADM, a solid with a melting point of 72-74° C.).

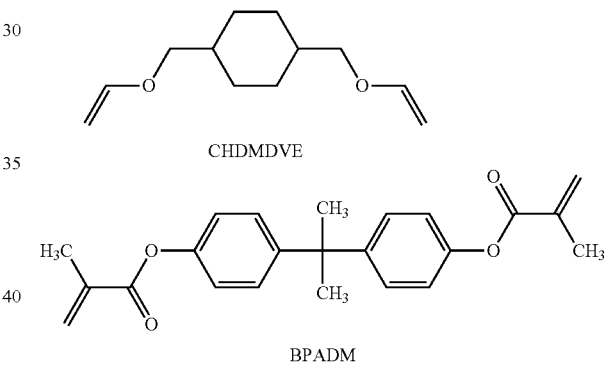

TABLE 2

| DSC Data for Wax/Monomer Blends | | | | |
|---|---|---|---|---|
| Sample | Melting Peak (° C.) | Resolidification Peak (° C.) | Delta | % Increase in Functionality |
| Sample 5 | 89 | 77 | 12 | NA |
| Sample 5 + 20% CHDMDVE | 84 | 72 | 12 | 62 |
| Sample 5 + 30% CHDMDVE | 79 | 69 | 10 | 92 |
| Sample 11 | 72 | 62 | 10 | NA |
| Sample 11 + 20% BPADM | 70 | 58 | 12 | 48 |
| Sample 11 + 20% CHDMDVE | 68 | 55 | 13 | 207 |

As shown in Table 2, by using 20-30% monomer amount, the impact on melting and resolidification peak values was not significant. However, the level of olefin functionality present increased substantially. The % increase in functionality were calculated from the equivalent weights of the various compounds, and refers to the % molar increase in olefin functionality relative to those found in the neat waxes.

Example 5 Support Wax Evaluation

Figure 3:
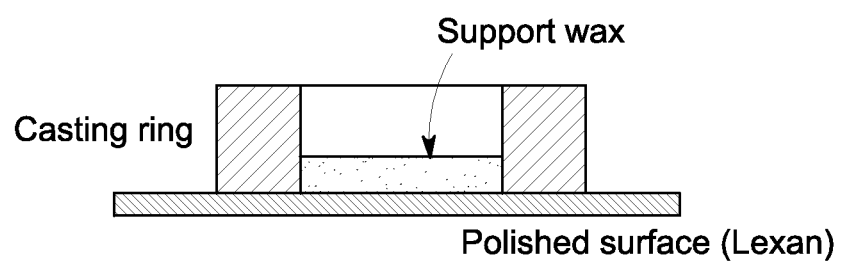
FIG. 3 illustrates a pictorial representation of a small-scale procedure to evaluate the effectiveness of the support composition in reducing roughness and porosity, according to an embodiment of the invention.
Figure 3:
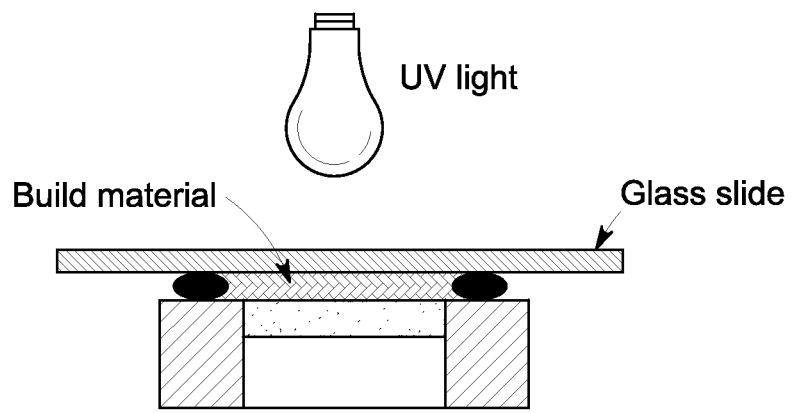
Figure 3:

FIG. 3 shows a pictorial representation of a small-scale procedure to evaluate the effectiveness of the support waxes in reducing roughness and porosity when used with VisiJet® MX build material. The support wax formulations were cast as molten liquids into one inch diameter rings with one side covered by Lexan film. On cooling, the plastic film was removed leaving a smooth wax surface (Step 1). VisiJet® MX build material was applied on top of the wax followed by a glass slide and a 125 μm spacer (to control the thickness). Some samples were heated to 55° C. for 10 minutes in order to facilitate interaction between the built material and the support wax. Other samples were maintained at room temperature. The samples were then UV-cured through the glass slide for 20 seconds (Step 2). The fixture was then placed in a 100° C. oven to remove most of the wax. The rest was cleaned off by immersing the sample in hexane at 40° C. for 2 hours. The roughness of the cleaned surfaces was then measured using chromatic white light profilometry (Step 3). VisiJet® S-300 support wax formulation was used as a control and a support wax formulation containing Sample 3 was used as a test formulation.

Figure 4:
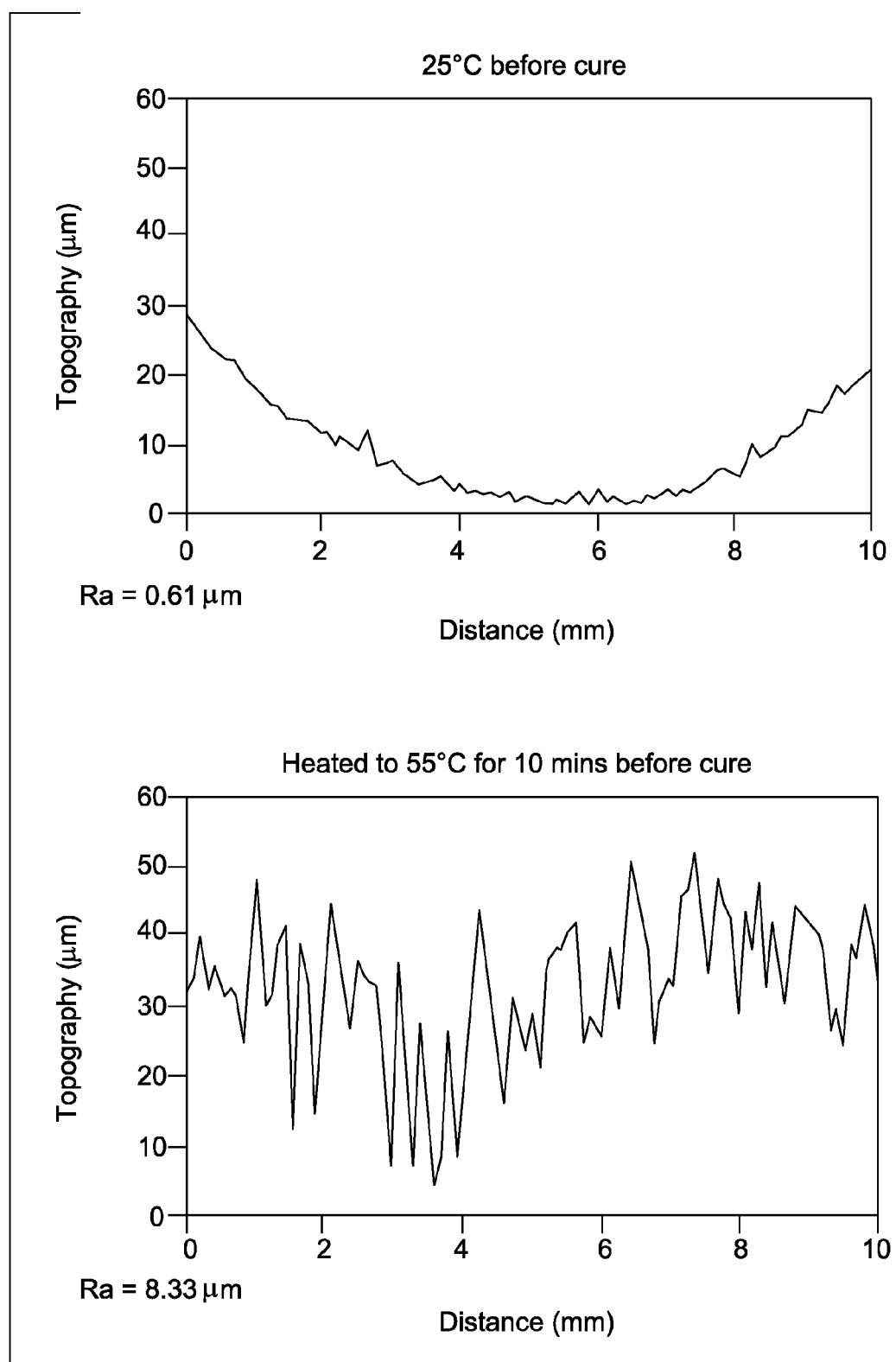
FIG. 4 shows the surface roughness profiles of build material films that were cured on top of a commercial-available support composition.

FIG. 4 shows the results from control experiments conducted using VisiJet® S-300 support wax with the VisiJet® MX build formulation. As shown in FIG. 4, the sample maintained at room temperature (25° C.) before UV cure was fairly smooth as the two materials were only in contact with each other as "solids" (although VisiJet® MX is more like a gel). The curvature in the sample was the result of the cured VisiJet® MX delaminating from the glass slide (due to cure shrinkage). When the sample was heated to 55° C. for 10 minutes before UV curing to enhance their intermixing, a much rougher surface was obtained, as shown in FIG. 4.

Figure 5:
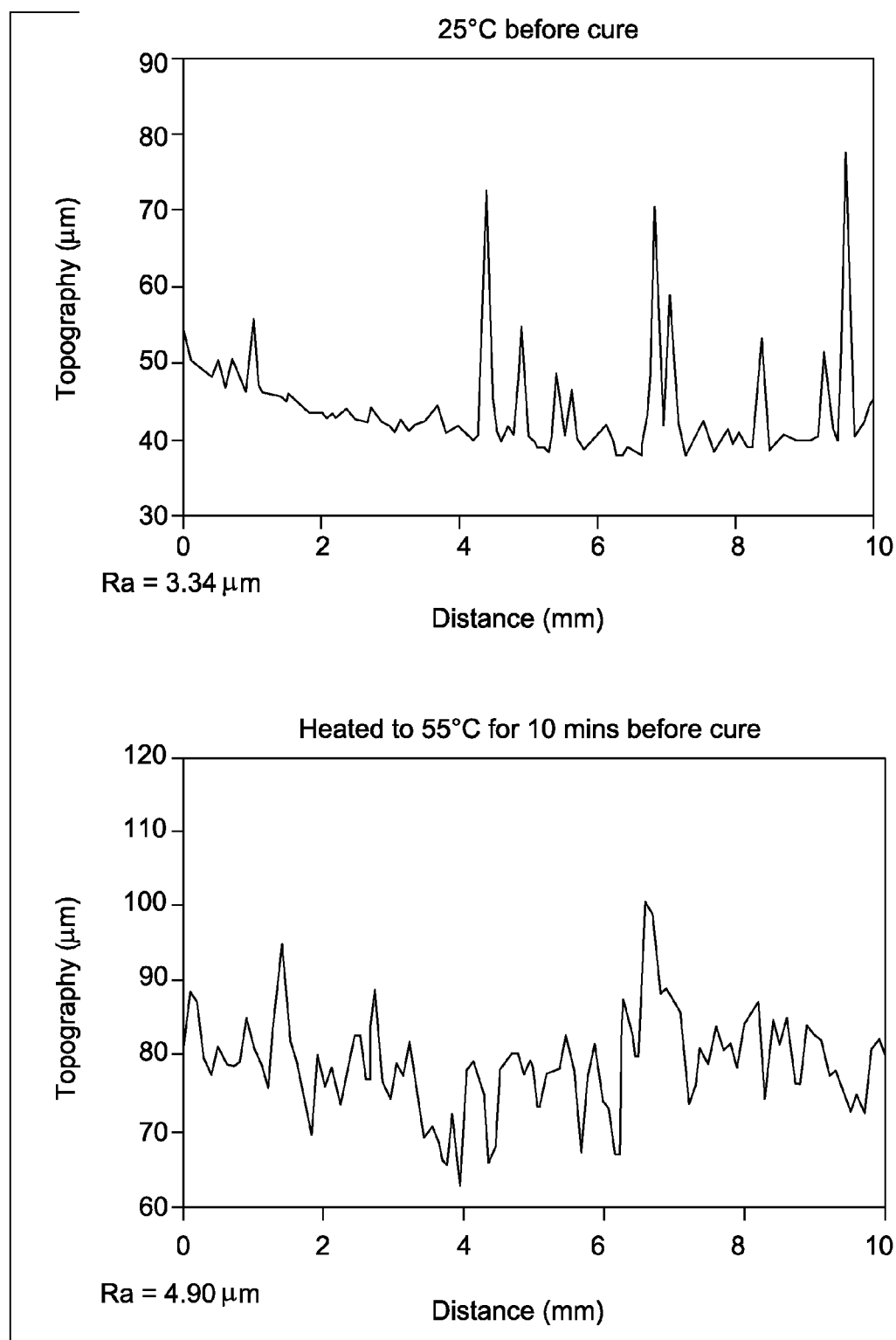
FIG. 5 shows the surface roughness profiles of build material films that were cured on top of a support composition, according to an embodiment of the invention.

FIG. 5 shows the results obtained with di(4-vinyloxybutyl) eicosanedioate (Sample 3) as the support wax with the VisiJet® MX build formulation. As shown in FIG. 5, the surface was rougher in the sample that had been heated to 55° C. when compared to the sample at room temperature. However, the difference between the 25° C. and 55° C. test results was smaller when compared to the control, indicating that the functionalized wax helps in reducing the surface roughness of the cured build material.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. A method of forming a three dimensional (3D) article, comprising:
   (i) selectively depositing a build material comprising at least one reactive group on a substrate to form a plurality of build layers;
   (ii) selectively depositing a support composition on the substrate to form a plurality of support layers, wherein the support composition comprises a wax functionalized with at least one functional group, the at least one functional group capable of reacting with the at least one reactive group of the build material, when exposed to an actinic radiation in the presence of a photoinitiator;
   (iii) exposing the plurality of support layers and the plurality of build layers to the actinic radiation; and
   (iv) reacting a portion of the at least one functional group in the wax with a portion of the build material at an interface of the plurality of build layers and the plurality of support layers, wherein a portion of the support composition is substantially unreacted after exposure to the actinic radiation.

2. The method of claim 1, further comprising subjecting the plurality of build layers and the plurality of support layers to a planarization step after step (ii).

3. The method of claim 1, further comprising contacting at least a portion of plurality of support layers with a solvent such that a portion of the support composition that is unreacted is substantially removed, and the portion of the support composition that has reacted with the build material is substantially retained in the 3D article.

4. The method of claim 1, wherein the functional group comprises vinyl ether.

5. The method of claim 1, wherein the functional group comprises maleate, fumarate, cinnamate, cinnamide, or combinations thereof.

6. The method of claim 1, wherein the wax comprises a fatty ester wax, a fatty amide wax, or a combination thereof.

7. The method of claim 1, wherein the number of functional groups in the wax is in a range from about 1 to about 6.

8. The method of claim 1, wherein the at least one reactive group of the build material comprises an acrylate moiety, a methacrylate moiety, or both.

9. The method of claim 1, wherein the support composition is substantially free of a photoinitiator.

10. The method of claim 1, wherein the support composition further comprises a monomer comprising an acrylate moiety, a methacrylate moiety, a vinyl ether moiety, a maleate moiety, a fumarate moiety, a cinnamide moiety, a cinnamate moiety, or combinations thereof.

11. The method of claim 1, wherein the actinic radiation comprises ultra violet (UV) radiation.

12. The method of claim 1, wherein the wax comprises a fatty ester wax.

13. A method of forming a three dimensional (3D) article, comprising:
   (i) selectively depositing a build material on a substrate to form a plurality of build layers;
   (ii) selectively depositing a support composition on the substrate to form a plurality of support layers, wherein the support composition comprises a fatty ester wax functionalized with at least one functional group, the at least one functional group capable of reacting with the at least one reactive group of the build material, when exposed to an actinic radiation in the presence of a photoinitiator, and the support composition is substantially free of the photoinitiator;
   (iii) exposing the plurality of support layers and the plurality of build layers to the actinic radiation;
   (iv) reacting a portion of the at least one functional group in the wax with a portion of the build material at an interface of the plurality of build layers and the plurality of support layers, wherein a portion of the support composition is substantially unreacted after exposure to the actinic radiation.

14. The method of claim 13, wherein the functional group comprises vinyl ether.

* * * * *